Figure 1:
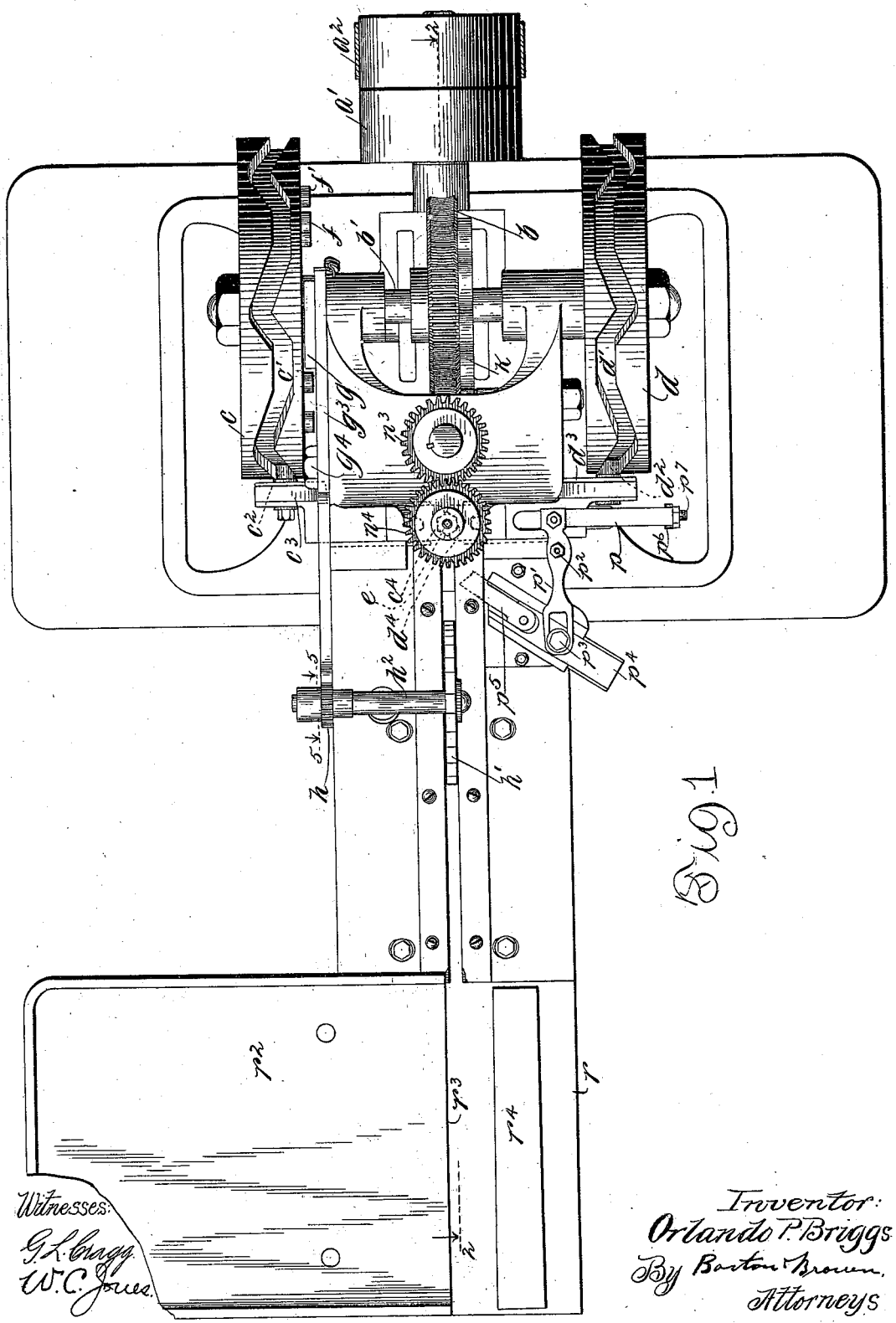

(No Model.) 3 Sheets—Sheet 1.
O. P. BRIGGS.
NUT REAMING MACHINE.

No. 556,084. Patented Mar. 10, 1896.

Witnesses:
G. L. Cragg
W. C. Jones

Inventor:
Orlando P. Briggs
By Barton Brown,
Attorneys

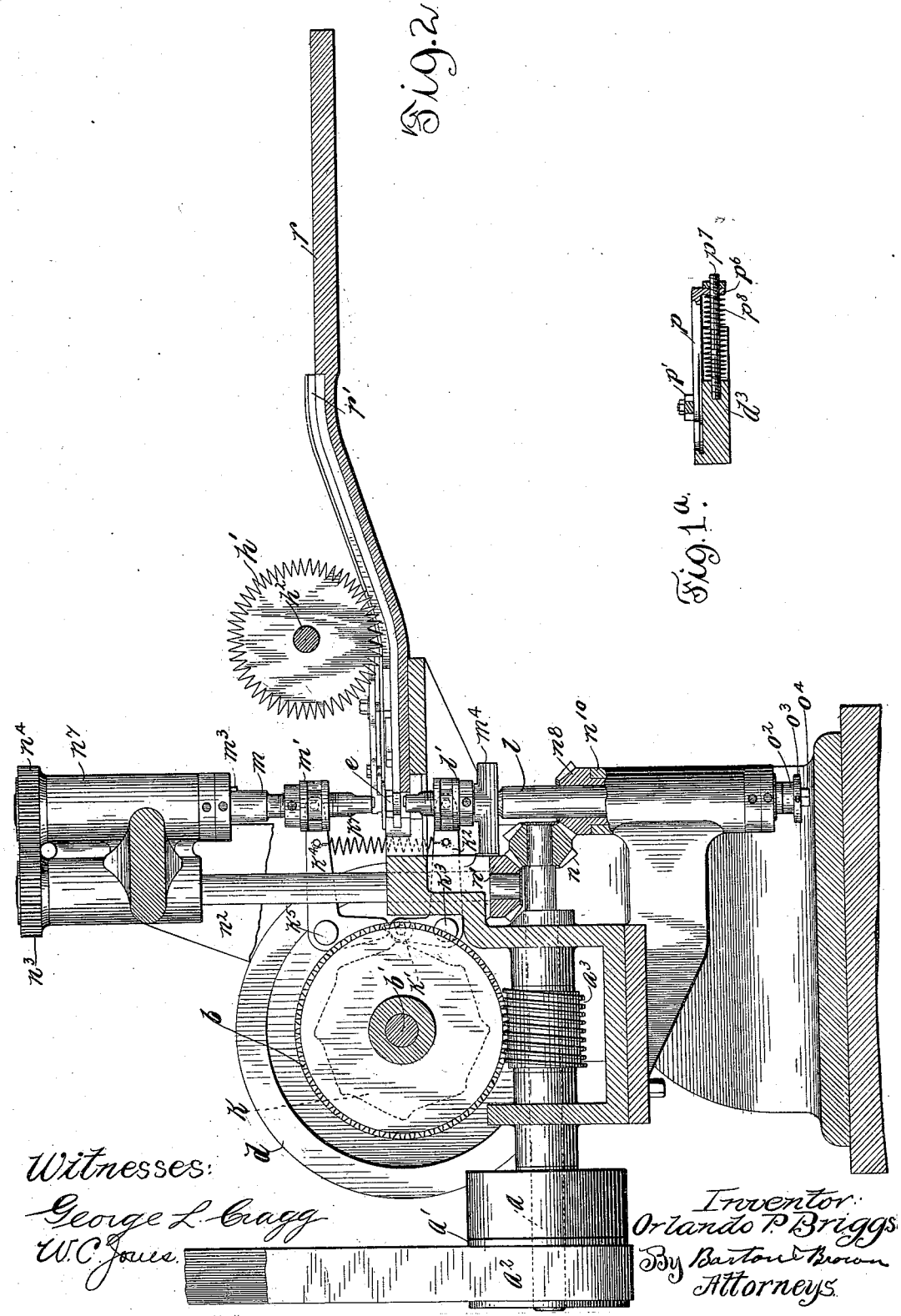

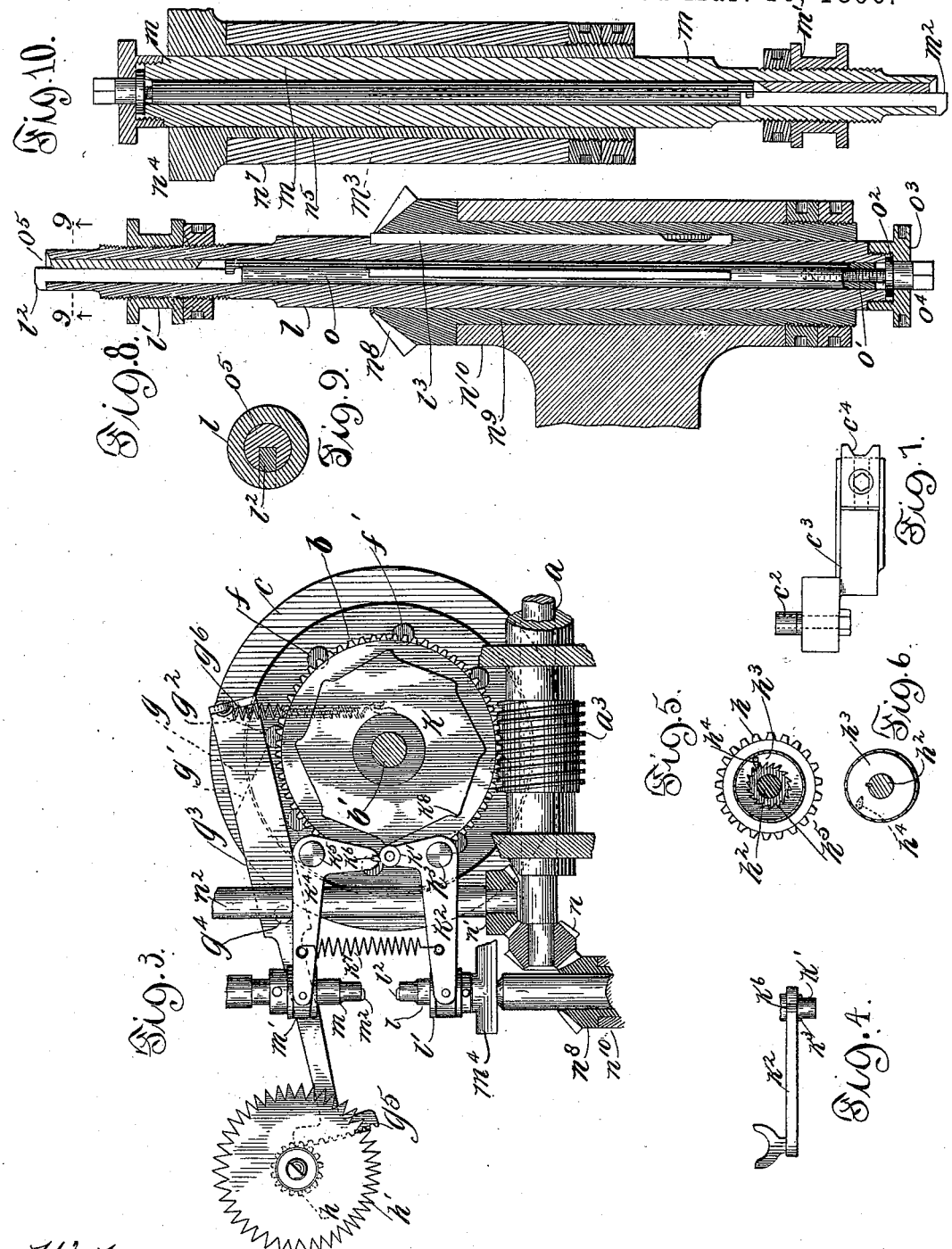

UNITED STATES PATENT OFFICE.

ORLANDO P. BRIGGS, OF CHICAGO, ILLINOIS, ASSIGNOR TO THE WESTERN ELECTRIC COMPANY, OF SAME PLACE.

NUT-REAMING MACHINE.

SPECIFICATION forming part of Letters Patent No. 556,084, dated March 10, 1896.

Application filed January 25, 1895. Serial No. 536,177. (No model.)

*To all whom it may concern:*

Be it known that I, ORLANDO P. BRIGGS, a citizen of the United States, residing at Chicago, in the county of Cook and State of Illinois, have invented a certain new and useful Improvement in Nut-Reaming Machines, (Case No. 11,) of which the following is a full, clear, concise, and exact description, reference being had to the accompanying drawings, forming a part of this specification.

My invention relates to a nut-reaming machine, my object being to construct a machine whereby the nuts to be reamed may be automatically fed to the machine, reamed, and then ejected therefrom.

In the preferred form the machine of my invention comprises a board or table upon which are placed the nuts to be reamed, a guideway being provided leading from the table, through which guideway the nuts are adapted to be passed in a row to the reaming mechanism. A feeding-disk is provided, adapted in its rotation to engage the nuts in the guideway and move the same forward. A finger moving at intervals across the guideway advances the nut to be reamed to a position between a pair of jaws, the jaws being carried upon carriages moved back and forth by a pair of cam-wheels. The nut to be reamed being clamped between the jaws, rotating reaming-tools are brought into contact with the opposite sides of the nut to ream the same. The spindles carrying the reaming-tools are splined in rotating sleeves, longitudinal movement of the spindles being thus permitted. Upon the spindles are provided collars adapted to be engaged by cam-actuated levers to impart longitudinal movement to the spindles to move the reaming-tools into and out of engagement with the nut to be reamed.

Referring to the accompanying drawings, Figure 1 is a plan view of a machine embodying my invention. Fig. 1$^a$ is a detail view of the yielding connection between the finger that advances the nuts and the mechanism that operates the same. Fig. 2 is a sectional view on line 2 2, Fig. 1. Fig. 3 is a view of the mechanism for rotating the feeding-disk and for approaching the reaming-tools. Fig. 4 is a detail view of one of the bell-cranks for moving longitudinally the spindles carrying the reaming-tools. Fig. 5 is a detail view on line 5 5, Fig. 1, looking in the direction of the arrows. Fig. 6 is a similar view looking against the arrows. Fig. 7 is a detail view of one of the carriages that carry the clamping-jaws. Fig. 8 is a longitudinal sectional view of the lower spindle and its bearing. Fig. 9 is a sectional view on line 9 9, Fig. 8. Fig. 10 is a sectional view of the upper spindle and its bearing.

Like letters refer to like parts throughout the different figures.

Upon the shaft $a$ is provided a pulley $a'$ adapted to be driven by a belt $a^2$. Upon the shaft $a$ is mounted a worm $a^3$ adapted to engage a worm-wheel $b$ mounted upon a shaft $b'$. Upon the opposite ends of the shaft $b'$ are provided cam-wheels $c$ $d$ provided in their peripheries with cam-grooves $c'$ and $d'$, respectively. Cam-rollers $c^2$ $d^2$ are adapted to engage the grooves $c'$ $d'$, the rollers being mounted, respectively, upon sliding carriages $c^3$ $d^3$, the carriages carrying upon their opposed ends jaws $c^4$ $d^4$, between which the nut $e$ to be reamed is adapted to be clamped. As the cam-wheels $c$ $d$ thus rotate, the rollers $c^2$ $d^2$, following the paths of the grooves, impart movement to the carriages $c^3$ $d^3$, causing the same to alternately approach and recede, to clamp and release the nut.

Upon one of the cam-wheels $c$ is provided a series of pins $f f'$, adapted to engage the oblique walls $g' g^2$ of a block $g$ carried upon a lever $g^3$ pivoted at $g^4$ and carrying upon its opposite end a rack $g^5$ adapted to engage a pinion $h$ mounted to rotate with a feeding-disk $h'$, which may be made of leather, and provided upon its periphery with teeth whereby it may readily engage the nuts to be reamed and feed the same forward through the guideway. To the end of lever $g^3$ carrying the block $g$ is secured a spring $g^6$ which tends to depress the end of the lever to which said spring is secured.

As seen in Fig. 3, the wheel $c$ is rotating in a clockwise direction, and one of the pins, as $f$, engages the wall $g'$ of block $g$, thus raising the end of the lever and moving the rack $g^5$ downward. The pinion $h$ is connected with the feeding-disk $h'$ by means of a pawl-and-ratchet device, which will be hereinafter described, so that the descent of rack $g^5$ does not impart motion to the disk $h'$. Upon the passage of pin $f$ past the edge $g'$ of block $g$ the spring $g^6$ reacts to depress the end of lever $g^3$, thus elevating the rack $g^5$ and rotating the pinion $h$ to thereby rotate the feeding-disk $h'$. In the descent of the end of lever $g^3$ the pin $f$ rides upon the edge $g^2$ of block $g$, thus producing a gradual downward movement of the end of the lever. Shortly after the pin $f$ has engaged and moved the lever $g^3$ the next pin engages the walls of block $g$ and the movement is repeated.

Figs. 5 and 6 illustrate in detail the pawl-and-ratchet device connecting the pinion $h$ with the feeding-disk $h'$. The feeding-disk $h'$ is mounted to rotate with the shaft $h^2$, upon which shaft is keyed a plate or disk $h^3$ carrying a pawl $h^4$. The pinion $h$ is mounted loosely upon the shaft $h^2$ and carries a ratchet-wheel $h^5$ adapted to be engaged by said pawl $h^4$. When the rack $g^5$ is elevated pinion $h$ is rotated clockwise, as seen in Fig. 5, the teeth of ratchet-wheel $h^5$ thus engaging pawl $h^4$ carried upon disk $h^3$ to rotate the shaft $h^2$, and with it the feeding-disk $h'$. When, however, the rack $g^5$ moves downward, the pinion $h$ is rotated contra-clockwise, the pawl $h^4$ thus riding over the teeth of ratchet-wheel $h^5$ without receiving motion therefrom. Upon the shaft $b'$ is mounted a cam-wheel $k$, upon the periphery of which a roller $k'$ is adapted to bear, said roller being carried upon the end of a bell-crank $k^2$ pivoted at $k^3$, the opposite end of said bell-crank engaging with a collar $l'$ mounted upon spindle $l$ carrying the reaming-tool $l^2$. A second bell-crank $k^4$, pivoted at $k^5$, engages by its shorter end a tongue $k^6$ carried upon the end of bell-crank $k^2$, whereby the movement of cam-roller $k'$ also swings the bell-crank $k^4$ upon its pivot. The opposite end of the bell-crank $k^4$ engages a collar $m'$ carried upon the spindle $m$ that supports the reaming-tool $m^2$. The longer arms of the bell-cranks $k^2$ and $k^4$ are connected by the spring $k^7$, which draws said arms toward one another, tending to thrust the roller $k'$ to the right (see Fig. 3) and approach the reaming-tools $l^2 m^2$.

As the cam-wheel $k$ rotates in a clockwise direction, as seen in Fig. 3, the cam-roller $k'$ is engaged by one of the projections $k^8$ upon the wheel $k$, thus moving the roller $k'$ outward and separating the reaming-tools. As the wheel $k$ continues its rotation the roller $k'$ moves gradually to the right, due to the reaction of spring $k^7$, the reaming-tools being thus gradually brought toward one another until the next of the projections $k^8$ upon the wheel $k$ engages the cam to move it again to the left, the reaming-tools being thus alternately brought toward one another and separated again. Upon the shaft $a$ is provided a bevel-gear $n$ adapted to engage a bevel-gear $n'$ mounted upon a shaft $n^2$, which carries upon its opposite end a gear-wheel $n^3$ meshing with a gear-wheel $n^4$ mounted upon a sleeve $n^5$ rotating in a bearing $n^7$. The spindle $m$ is splined to the sleeve $n^5$ by key $m^3$, thus permitting longitudinal movement of the spindle relatively to the sleeve. The bevel-gear $n$ is also provided with teeth meshing with a bevel-gear $n^8$ mounted upon a sleeve $n^9$ rotating in a bearing $n^{10}$. The spindle $l$ is splined to the sleeve $n^9$ by a key $l^3$, which permits the longitudinal movement of the spindle relatively to said sleeve $n^9$.

The means for maintaining the reaming-tools in position are illustrated in Figs. 8 and 9. Within the spindle $l$ is provided a rod $o$, adapted to be moved longitudinally by a screw $o'$, which carries a collar $o^2$ adapted to be held between the end of the spindle and the cap $o^3$ screwed upon the end thereof, the screw $o'$ being provided with a head $o^4$ extending through the cap $o^3$, whereby the screw may be rotated. To the end of the rod $o$ is secured the reaming-tool $l^2$, the reaming-tool fitting in a channel provided in the holder $o^3$ fitting in the end of the bore of the spindle $l$.

Upon the carriage $d^3$ is provided a slide $p$, to which is pivoted one end of a lever $p'$, pivoted at $p^2$, the opposite end of said lever $p'$ engaging a pin or bolt $p^3$ carried upon a carriage $p^4$. Upon the carriage $p^4$ is provided a finger $p^5$, which, as the carriage $p^4$ is advanced, engages and moves the nuts to be reamed toward the position between the jaws $c^4 d^4$. In order to render the finger $p^5$ yielding, the slide $p$ is provided at the end with a downward extension $p^6$, through which passes a rod $p^7$ mounted upon the carriage $d^3$, said rod being surrounded by a coiled spring $p^8$, one end of which rests against the end of carriage $d^3$, while the opposite end rests against said extension $p^6$. Should the finger $p^5$ meet an unyielding resistance, the spring $p^8$ yields to the pressure, thus preventing the breakage of any of the parts.

A feeding-plate $r$ is provided upon the machine, having its surface flush with the floor of guideway $r'$, so that nuts placed upon said plate $r$ may be passed to said guideway. To the side of said plate $r$ is provided a feeding-board $r^2$, the surface of which is raised above the surface of plate $r$, the edge $r^3$ of board $r^2$ forming a wall flush with the wall of guideway $r'$. The nuts to be reamed are placed upon board $r^2$, from which a few of the nuts are brushed onto plate $r$, after which by means of a block $r^4$, which may be moved over the face of plate $r$, the nuts may be brought into line against the wall $r^3$ and advanced into the guideway $r'$. The guideway $r'$ is of such width as to permit the passage of the nuts only when lying with the lesser dimension between the walls of the guideway, the nuts being arranged in line in this position against wall $r^3$ by means of block $r^4$. The nuts passing into guideway $r'$ are engaged and moved forward by the feeding-disk $h$. As the cam-wheels $c\ d$ rotate to separate the jaws $c^4\ d^4$, clamping the nut which has just previously been reamed, the finger $p^5$ carried upon the carriage $p^4$ is thrust forward, thus engaging and advancing the nuts in the guideway $r'$ and thrusting from the end of the guideway the nut that has just previously been reamed and released by the jaws $c^4\ d^4$, the nut falling into a receptacle which may be provided for the same. Upon the frame of the machine is mounted a shield $m^4$, which prevents the nuts and chippings from falling upon the bevel-gears. The spindle $l$ moves freely through an opening provided in said shield. The further rotation of the cam-wheels $c\ d$ approaches the jaws $c^4\ d^4$, which engage and maintain in position a nut which has been advanced by the finger $p^5$, the carriage $p^4$ being at the same time moved backward to withdraw the finger $p^5$ from the guideway $r'$. The rotation of the cam-wheel $k$ now permits the spring $k^7$ to gradually draw the rotating reaming-tools $l^2\ m^2$ toward one another to engage and ream the opposite sides of the nut held between the clamping-jaws. As soon as the nut has been reamed one of the projections $k^8$ upon the cam-wheel $k$ engages the roller $k'$, thus separating the reaming-tools. During the reaming operation one of the pins $f$ carried upon the cam-wheel $c$ has engaged the edge $g'$ of block $g$ carried upon the lever $g^3$, thus bringing the rack $g^5$ to its lower position, and now as the reaming-tools are separated the edge $g^2$ of block $g$ rides upon said pin $f$ to permit the upward movement of rack $g^5$, thus rotating the feeding-disk $h$ and advancing the nuts through the guideway. The jaws $c^4\ d^4$ at the same time separate and the finger $p^5$ is advanced to thrust another nut in position to be engaged by the jaws and to eject the nut which has been reamed.

Having described my invention, what I claim as new, and desire to secure by Letters Patent, is—

1. In a nut-reaming machine, the combination with the spindles $l\ m$, of the bell-cranks $k^2\ k^4$ engaging said spindles, cam-wheel $k$, cam-roller $k'$ bearing upon said wheel $k$ and mounted to move with said bell-cranks, and spring $k^7$; substantially as described.

2. In a nut-reaming machine, the combination with shaft $a$ of shaft $n^2$ geared therewith, sleeve $n^5$ geared to shaft $n^2$, spindle $m$ splined to said sleeve, sleeve $n^9$ geared to shaft $a$, and spindle $l$ splined in said sleeve; substantially as described.

3. In a nut-reaming machine, the combination with pinion $h$, of feeding-disk $h'$ adapted to be rotated when said pinion is rotated in one direction, lever $g^3$ carrying rack $g^5$ adapted to engage said pinion, said lever carrying oblique walls $g'\ g^2$, rotating pins $f\ f'$, and spring $g^6$ substantially as described.

4. In a nut-reaming machine, the combination with a guideway over which the nuts to be reamed are passed, of clamping-jaws one upon each side of the guideway for holding the nut to be reamed, and a finger adapted to be moved across said guideway and to pass between said nuts to thrust the same forward to a position to be engaged by said clamping-jaws; substantially as described.

5. In a nut-reaming machine, the combination with a feeding-plate, of a guideway leading therefrom, a feeding-board upon which the nuts are placed, situated at one side of the feeding-plate and at a greater height, the edge of the feeding-board being coextensive with the wall of the guideway so that nuts may be arranged in line against the edge of the feeding-board and advanced to the guideway; substantially as described.

6. The combination with the longitudinally-moving rod carrying the tool, of the hollow spindle supporting the rod, a cap screwed to the end of said spindle and a screw engaging the end of said tool-carrying rod and extending through said cap, said screw being provided with a collar adapted to rest between the end of said spindle and said cap; substantially as described.

7. In a nut-reaming machine, the combination with a guideway for conducting the nuts to the reaming-machine and terminating a short distance beyond the mechanism, of a finger moving transversely across said guideway and adapted to pass between two nuts in the guideway to advance the nut next to be reamed and to thrust a nut previously reamed from the end of the guideway; substantially as described.

In witness whereof I hereunto subscribe my name this 1st day of December, A. D. 1894.

ORLANDO P. BRIGGS.

Witnesses:
DE WITT C. TANNER,
W. CLYDE JONES.